United States Patent

[11] 3,603,021

| [72] | Inventor | John F. Nunley |
| | | 5425 S. Rice Ave., Houston, Tex. 77036 |
| [21] | Appl. No. | 826,595 |
| [22] | Filed | May 21, 1969 |
| [45] | Patented | Sept. 7, 1971 |

[54] FISH HOOK DISENGAGING TOOL
2 Claims, 4 Drawing Figs.

| [52] | U.S. Cl. | 43/53.5 |
| [51] | Int. Cl. | A01k 97/00 |
| [50] | Field of Search | 43/53.5 |

[56] References Cited
UNITED STATES PATENTS

| 2,289,767 | 7/1942 | Ford | 43/53.5 |
| 2,793,463 | 5/1957 | Nieman | 43/53.5 |
| 2,998,670 | 9/1961 | Edwards | 43/53.5 |

*Primary Examiner*—Samuel Koren
*Assistant Examiner*—Daniel J. Leach
*Attorney*—Ranseler O. Wyatt

ABSTRACT: A disengaging tool having means for guiding the tool into position on a fish hook shank, and having means for rotating action against the hooked fish to disengage the fish hook from the flesh of the fish upon rotation of the tool, without contacting the fish with the hands of the user.

PATENTED SEP 7 1971

3,603,021

JOHN F. NUNLEY
INVENTOR.

BY Ransdel O. Wyatt

ATTORNEY

3,603,021

FISH HOOK DISENGAGING TOOL

SUMMARY OF THE INVENTION

This invention pertains to a disengaging tool for removing fish caught on a fish hook, the said tool having a rigid shaft and a handle on one end thereof, and being bent to form a loop in the other end. The loop extends laterally from the shank of the shaft, and is substantially triangular in shape to provide a rotating arm that will follow the contour of the hook as the tool is rotated, and to position the hook in the loop so that the shaft of the tool bears against the shank of the hook as the loop bears against the flesh of the fish at the point of penetration of the hook barb.

DESCRIPTION OF THE PREFERRED EMBODIMENT

Figure 1:
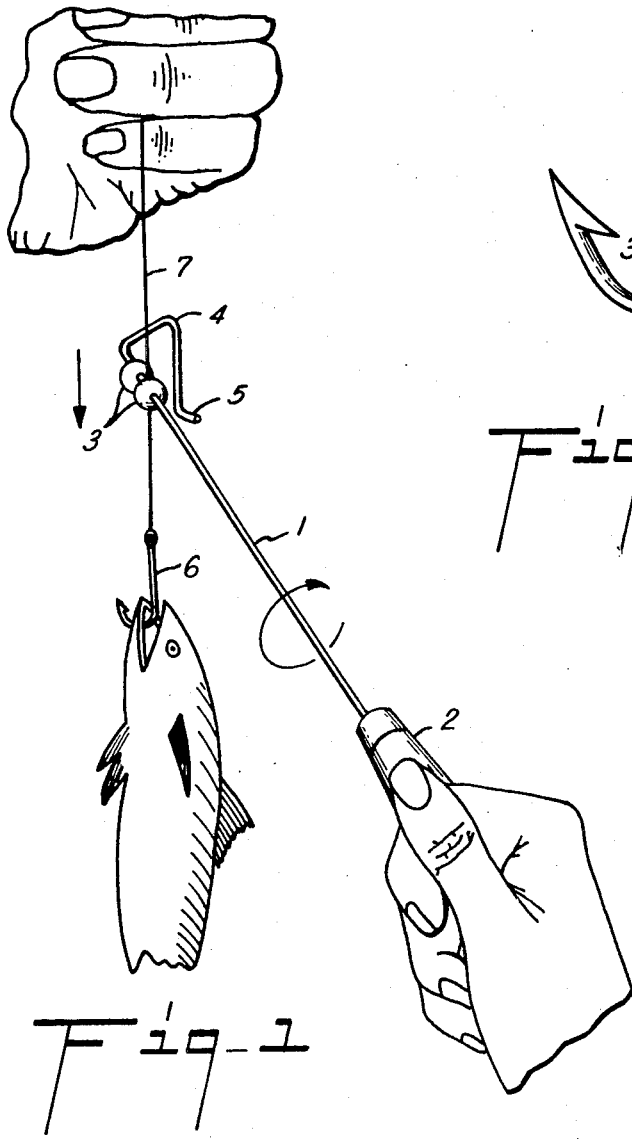
FIG. 1 is an elevational view of the tool being applied to a fishing line on which a fish hook is mounted and on which a fish has been caught.

In the drawings, the numeral 1 designates the shank of a shaft of rigid material, such as a rod, having a suitable handle 2 at one end and a pair of guides, such as the loosely mounted beads 3, 3 adjacent the other end. The guides 3 are restricted in their longitudinal movement on the shaft 1 by means of the top arm 8 of the loop 4 formed in the extended end of the shaft. The loop 4 is formed by a lateral bend, at a sharp angle from the shank 1 of the shaft forming the top arm 8, and another bend inwardly toward the shank of the shaft forming the side arm 9, and again bending the shaft outwardly at a point adjacent said shank forming the outwardly extending terminal 5, and leaving a passageway between the last mentioned bend in the shaft and the shank of the shaft, through which a fishing line, as 7, may be passed.

The extent of the top arm 8 from the shaft 1 may be varied, depending on the range of hook sizes sought to be serviced. The size of hook to be serviced is limited by the length of the top arm 8 and side arm 9.

Figure 2:
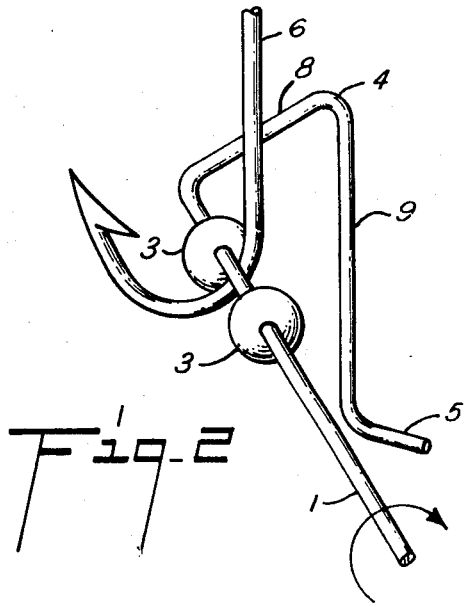
FIG. 2 is an enlarged view of the end of the tool, applied to the fish hook as the tool is moved into position.
Figure 3:
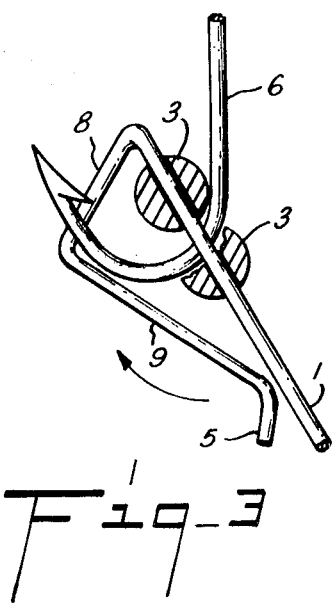
FIG. 3 is an enlarged view of the end of the tool applied to the fish hook as the tool is rotated and moved into rotating position.

When a fish has been caught on the hook 6, the line 7 adjacent the hook may be held in one hand by the fisherman, and the tool herein described held in the other hand. The passageway adjacent the end of the shaft 5 will permit the line 7 to enter the loop and be positioned between the guides 3, 3 within the loop 4. The tool is then moved down the line 7 until the shank of the hook 6 is positioned between the beads 3, 3 as shown in FIG. 2, and the user applies a slight pressure on the handle of the tool to position the loop on the hook and rotates the tool, causing the inwardly extending arm 9 to move against the shank of the hook, the guides 3, 3 being moved longitudinally on the shaft 1 according to the size of the hook, and in response to the thrust pressure being applied by the user. As the tool rotates, the arm 9 follows the curve of the hook until the arm 9 contacts the flesh of the fish, in a rotating action, and the shaft 1 will be forced against the hook shank as the arm 9 pushes against the flesh of the fish at the point of penetration of the hook point, to back the barb portion of the hook out of hooking relation.

Where a hook is swallowed by the fish, the same procedure is followed, and in such instance the user takes care to rotate the handle in a rotating action only so far as is necessary to disengage the hook, and uses the arm 9 to guard the hook point, to permit removal of the hook without reengagement.

Figure 4:
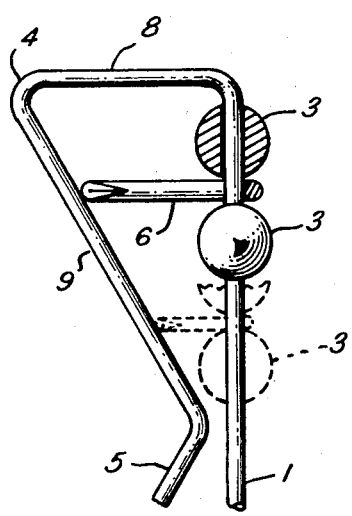
FIG. 4 is a side elevational view of the tool and showing in dotted lines the application of the tool to a small hook.

As shown in FIG. 4, the guide beads 3, 3 are loosely mounted, so that when disengaging large hooks, as 6, the beads will move to the maximum position forward on the shaft 1, and when small hooks are encountered, the beads 3, 3 may be moved in the opposite direction, to the limitation caused by the contact with the loop adjacent the end 5, thus providing use on a range of hook sizes that may be removed that will readily accommodate the average needs of sport fishermen as well as commercial fishers.

As will be seen from the foregoing, it is not necessary for the fisherman to touch the fish with his hands, thus avoiding contact with the scales or fins of the fish, and in the case of small fish, or nonkeepers, the fish may be disengaged from the hook with minimum damage to the fish and with no contact with the hands of the fisherman.

What I claim is:

1. In a fish hook removing tool, a rigid shaft forming a shank, a handle on one end thereof, a loop formed in the other end, the said loop being formed with a portion bent inwardly to a point adjacent the said shank and then bent outwardly to provide a passageway into said loop, the said loop having a substantially triangular conformation against which the curve of the hook to be removed bears as the tool is rotated, and guides on said shank within said loop, said guides moving longitudinally on said shank with the positioning of the hook in the loop.

2. The device defined in claim 1 wherein said guides to guide the tool into position on a hook to be removed are loosely mounted on said shank.